(12) United States Patent
Yoon et al.

(10) Patent No.: US 9,389,639 B2
(45) Date of Patent: Jul. 12, 2016

(54) ELECTRONIC DEVICE WITH STRUCTURE FOR INSERTING CARD TYPE EXTERNAL DEVICE

(71) Applicant: Samsung Electronics Co., Ltd, Suwon-si, Gyeonggi-do (KR)

(72) Inventors: Byoung-Uk Yoon, Gyeonggi-do (KR); Jong-Chul Choi, Gyeonggi-do (KR); Hyoung-Wook Yi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 14/194,522

(22) Filed: Feb. 28, 2014

(65) Prior Publication Data

US 2014/0240910 A1 Aug. 28, 2014

(30) Foreign Application Priority Data

Feb. 28, 2013 (KR) ........................ 10-2013-0021778

(51) Int. Cl.
*G06F 1/16* (2006.01)
*H04M 1/23* (2006.01)

(52) U.S. Cl.
CPC ................. *G06F 1/16* (2013.01); *H04M 1/236* (2013.01); *H04M 2250/14* (2013.01)

(58) Field of Classification Search
CPC combination set(s) only.
See application file for complete search history.

(56) References Cited

U.S. PATENT DOCUMENTS

| | | | |
|---|---|---|---|
| 6,954,653 B2 * | 10/2005 | Morita | 455/550.1 |
| 7,221,961 B1 * | 5/2007 | Fukumoto et al. | 455/557 |
| 7,233,489 B2 * | 6/2007 | Toyama et al. | 361/679.31 |
| 7,718,911 B2 * | 5/2010 | Lin et al. | 200/333 |
| 7,865,210 B2 * | 1/2011 | Wang et al. | 455/550.1 |
| 8,337,223 B2 * | 12/2012 | Gao et al. | 439/159 |
| 8,371,878 B2 * | 2/2013 | Tang | 439/630 |
| 8,672,229 B2 * | 3/2014 | Pesonen et al. | 235/486 |
| 8,724,311 B2 * | 5/2014 | Hsu | 361/679.4 |
| 8,767,381 B2 * | 7/2014 | Shukla et al. | 361/679.01 |
| 8,947,885 B2 * | 2/2015 | Wu | 361/754 |
| 9,002,403 B2 * | 4/2015 | Zhao et al. | 455/558 |
| 9,106,310 B2 * | 8/2015 | Dondzik et al. | |
| 2004/0062010 A1 * | 4/2004 | Pan et al. | 361/715 |
| 2004/0082210 A1 * | 4/2004 | Wallace et al. | 439/152 |
| 2006/0073848 A1 * | 4/2006 | Kwon | 455/558 |
| 2007/0032122 A1 * | 2/2007 | Wang | 439/374 |
| 2008/0081677 A1 * | 4/2008 | Lai | 455/575.1 |
| 2010/0055948 A1 | 3/2010 | Zuo | |

(Continued)

FOREIGN PATENT DOCUMENTS

| | | |
|---|---|---|
| CN | 101668395 | 3/2010 |
| CN | 202310044 | 7/2012 |

(Continued)

OTHER PUBLICATIONS

First Office Action dated Apr. 5, 2016 in connection with Chinese Patent Application No. 201310608098.4; 15 pages.

*Primary Examiner* — Lisa Lea Edmonds

(57) ABSTRACT

An electronic device includes a structure for inserting a card-type external device. The electronic device includes a case frame, a slot, a first unit, a second unit, and an external device. The slot is formed in the case frame and has a certain size. The first unit is disposed at a location corresponding to the slot inside the electronic device. The second unit corresponds to the slot inside the electronic device and is installed around the first unit. The external device is detachably mounted in the first unit through the slot.

20 Claims, 7 Drawing Sheets

(56) References Cited

U.S. PATENT DOCUMENTS

2011/0255252 A1* 10/2011 Sloey et al. .................. 361/752
2011/0312270 A1    12/2011 White
2013/0240629 A1*  9/2013 Pesonen et al. .............. 235/486

FOREIGN PATENT DOCUMENTS

| CN | 102664648 | 9/2012 |
|---|---|---|
| KR | 10-2008-0036495 | 4/2008 |

* cited by examiner

ELECTRONIC DEVICE WITH STRUCTURE FOR INSERTING CARD TYPE EXTERNAL DEVICE

PRIORITY

The present application is related to and claims priority under 35 U.S.C. §119 to an application filed in the Korean Intellectual Property Office on Feb. 28, 2013 and assigned Serial No. 10-2013-0021778, the contents of which are incorporated herein by reference.

TECHNICAL FIELD

The present disclosure relates generally to an electronic device, and in particular, to an electronic device with a structure for inserting a card type external device.

BACKGROUND

Due to recent developments, electronic devices are being applied to various fields closely related to our lives. Among these electronic devices, mobile terminals have been established as one of the most essential machines in our lives. Such mobile devices have shown remarkable progress in processing speed, and since devices like smart phones with additional functions like web surfing have formed the mainstream, it is no exaggeration to say that most people have at least one mobile terminal.

Electronic devices are being produced in various sizes according to different functions and users' preferences. Even if these devices have substantially similar functions compared to its competitors, devices with lighter, simpler, slimmer designs tend to be preferred by users.

Since electronic devices are becoming slimmer and multi-functional, external devices that are detachably mounted on the outside of external devices and are usable according to necessity are emerging.

External devices include a memory card that expands the memory space of the electronic devices and a personal identification card such as Subscriber Identification Module (SIM) card detachably installed to allow multiple users to use one electronic device. Generally, external devices are in the form of cards, which is ideal for application on electronic devices that are becoming slimmer, as well as for minimizing an installation space. Accordingly, many electronic devices have a separate slot at a location on the exterior; by selectively inserting a card into the slot, a user can electronically connect the card to the electronic device to use the additional functions.

However, since electronic devices may have a separate slot to insert a card-type external device, the exterior of the electronic devices may become less elegant. Accordingly, a design limitation occurs upon designing of the electronic device.

Furthermore, since a separate cover is often used in order to protect the installed external devices, there is a limitation related to the manufacturing cost and the assembly man-hour increase due to an increase of the number of parts.

SUMMARY

To address the above-discussed deficiencies of the prior art, it is a primary object of the present disclosure is to provide an electronic device with a structure for inserting an external device, which can improve the product competitiveness by reducing the total volume while holding more various functions.

Another object of the present disclosure is to provide an electronic device with a structure for inserting an external device, which can be configured to have an elegant exterior and avoid a design limitation by excluding a separate addition slot (or cut line) for inserting an external device.

Another object of the present disclosure is to provide an electronic device with a structure for inserting an external device, which can reduce the number of parts and the assembly time and thus reduce manufacturing costs.

Another object of the present disclosure is to provide an electronic device with a structure for inserting an external device, which can contribute to the elegance and slimming of the exterior and thus contribute to the improvement of reliability of a product by using at least one of existing input/output devices provided in the electronic device as a common external device insertion structure.

According to an aspect of the present disclosure, an electronic device includes a case frame, a slot formed in the case frame, a first unit disposed at a location corresponding to the slot inside the electronic device, a second unit corresponding to the slot inside the electronic device and installed around the first unit, and an external device detachably mounted in the first unit through the slot.

The electronic device may include a substrate therein, and the first unit may be an external device socket that is mounted on the substrate and configured to be electrically connected to the external device.

When the external device is inserted into the external device socket, the external device socket may be electrically connected to the electronic device to automatically perform a corresponding function. The external device may include a card-type device. The external device may include at least one of a card-type small sized memory, a Subscriber Identification Module (SIM) card, and a miniaturized auxiliary device.

The second unit may include at least one of a switching unit operated by a key button, a portion of which is exposed to the outside of the electronic device, a connector port configured to perform data input and output and charging functions, an earphone jack to which an earphone jack plug of an external speaker unit is connected, and an input/output terminal separately provided for the data input and output. A portion or all of the key button may be installed to be detachable from the slot of the electronic device, and thus is usable as a cover and key button for the slot.

The key button may include: a body, at least one pressuring protrusion that protrudes from the body to the slot to pressurize the switching unit, and at least one hook protrusion that protrudes from the body and prevents the key button from being separated from the slot by hooking on the inner side of the slot when the key button is mounted in the slot. The body and the pressurizing protrusion may be insert-molded with a flexible material and the exterior of the key button may be formed of a substantially rigid material. The flexible material may include at least one of rubber, silicone, and urethane.

The body may further include a hook groove such that a user may easily open the key button from the slot of the electronic device. The hook groove may be formed to have a certain depth along a longitudinal direction of the body. The hook groove may be a groove that is formed to have a certain depth in at least a portion of the body and allow a nail or a tool to be hooked in the groove.

The electronic device may further include a separation protrusion that protrudes from the body along a longitudinal direction of the body. The separation protrusion may also be insert-molded and assembled with a more flexible material than the body.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present disclosure will be described herein below with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms may vary depending on user's or operator's intentions or practices. Therefore, the terms used herein are to be understood based on the descriptions made herein.

For explanation of the present disclosure, a mobile terminal will be used as an example of an electronic device, and a card-type external device applied to such a mobile terminal will be illustrated. However, without being limited thereto, the electronic device may include, for example, portable electronic devices, portable terminals, mobile pads, media players, tablet computers, handheld computers, and Personal Digital Assistants (PDAs). However, besides these portable electronic devices, the card-type external device insertion structure may be applied to various kinds of fixed electronic devices such as Personal Computers (PCs).

Figure 1:
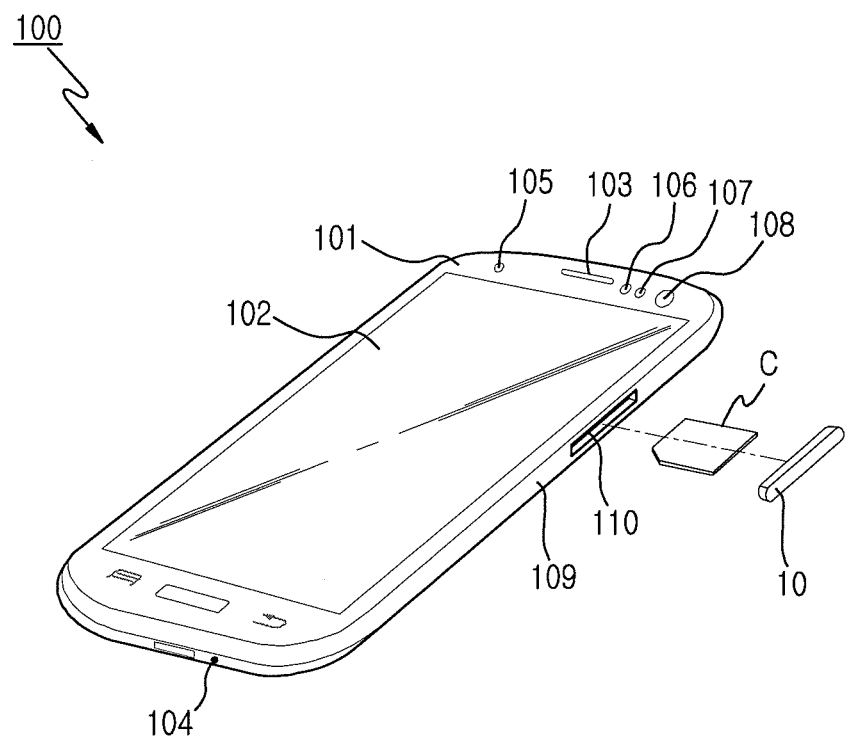
FIG. 1 is a perspective view of an electronic device showing a state where card-type external devices are inserted according to various embodiments of the present disclosure.

FIG. 1 is a perspective view of an electronic device showing a state where card-type external devices C are inserted according to various embodiments of the present disclosure. As shown in FIG. 1, the electronic device may be a mobile communication terminal.

Referring to FIG. 1, an electronic device 100 may include a display unit 102 at the front side 101 thereof. The display unit 102 may be a touch screen device which can implement both data input and output. The electronic device 100 may include a microphone unit 104 for transmitting voice and audio to a counterpart at a lower side of the display unit 102, and may include a speaker unit 103 for receiving voice and audio from the counterpart at an upper side of the display unit 102. The electronic device 100 may include a plurality of auxiliary units 105, 106, 107 and 108 around the speaker unit 103. For example, when the electronic device 100 is a mobile terminal, these auxiliary units may include a camera module 108 for capturing an subject, an illuminance sensor for adjusting the brightness of the display unit 102 by sensing the ambient brightness, a proximity sensor for turning off a display screen while talking over the mobile terminal, and a service LCD 105 allowing a user of the mobile terminal to visually recognize a transmission/reception state of a message and a call connection state.

The electronic device 100 may include a slot 110 having a certain length at the side of the electronic device 100. The card-type external device C may be detachably installed in the slot 110. Thereafter, the cover and key button 10 may be installed to close the slot 110 to protect the external device C that is mounted and simultaneously prevent external foreign substances from being introduced through the slot 110. When the cover and key button 10 is installed in the slot 110, the cover and key button 10 may serve as a cover for protecting the slot 110, and may be utilized as a volume up/down key button for performing a data input at the side 109 of the electronic device 100. That is, in this embodiment, since the external device C is detachably mounted in the slot 110 together with the volume key button that is an existing data input/output device, a separate external device insertion slot may not be needed.

The external device C according an embodiment of the present disclosure may be implemented as a card-type, but may be implemented in a form other than a card-type together with the data input/output device. Furthermore, in this embodiment, the card-type may include a micro Secure Digital (SD) card or a Subscriber Identification Module (SIM) card which can be applied to a mobile terminal. However, without being limited thereto, for larger electronic devices such as a PC, a detachable storage device such as a Solid State Disk (SSD) may also be applicable.

In addition, in this embodiment, although the slot 110 into which the volume key button 10 of the electronic device 100 is inserted is configured to be detachable together with the external device C, the present disclosure is not limited thereto. For example, in addition to the volume key button 10, a side key button unit may be configured together with various kinds of existing data input/output devices that are provided in the electronic device 100. Such a side key button unit may be used as a data input unit of the electronic device 100 and perform at least one of a slip/wake-up function, a camera function, and a power on/off function, a connector port disposed for the purpose of data transmission/reception and charging, or an earphone jack for receiving an earphone jack plug of an external earphone.

For example, the external device insertion structure according to this embodiment may be applied to various data input/output devices that are applicable to the electronic device 100. Also, the external device insertion structure may also be applied to data input/output devices of electronic device without a separate cover or key button.

Figure 2:
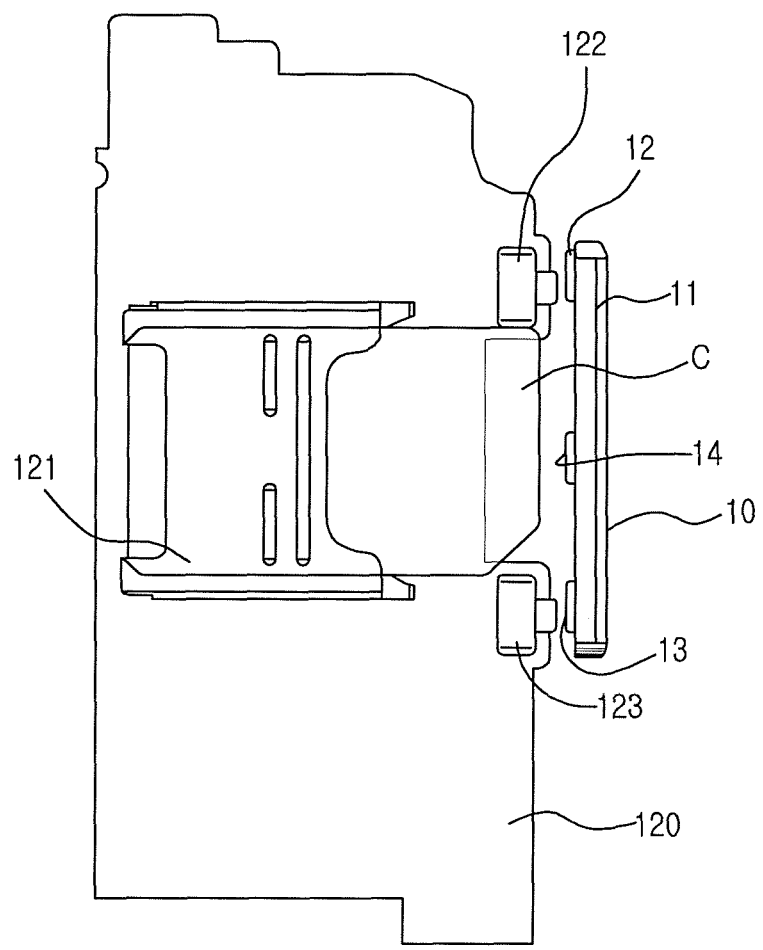
FIG. 2 is a view of a main part showing a state where an external device is inserted into the electronic device of FIG. 1 according to an embodiment of the present disclosure.

FIG. 2 is a view of a main part showing a state where an external device is inserted into the electronic device 100 of FIG. 1 according to an embodiment of the present disclosure. The electronic device 100 may include a substrate 120, and the substrate 120 may be mounted with switching units 122 and 123. The switching units 122 and 123 may be a volume up switching unit 122 and a volume down switching unit 123 that are pressurized by the volume key button. The switching units 122 and 123 may be mounted on the substrate 120 to be spaced from each other by a certain distance. An external device socket 121 may be mounted between the switching units 122 and 123, and may receive the card-type external device C.

The external device socket 121 may be electrically connected to the substrate 120, and may automatically perform a corresponding function according to the external device C that is selectively mounted. For example, when the external device C is a small-sized memory card, and the external device socket 121 is mounted, the storage capacity of the electronic device 100 may automatically increase. Also, when the external device C is a SIM card, the electronic device may authenticate a subscriber, and then may perform a corresponding communication function.

Also, since the size of external devices is continuously being miniaturized according to the development of technology, and external devices of different sizes are alternately used in the same electronic device according to situations, a method of additionally using a separate holder or an auxiliary tray on which an external device can be placed for convenience of a user in an actual use situation may also be included. The auxiliary tray or the separate holder may be formed integrally with a connector or a set, and may be implemented in the form of a drawer that is not separated from the set. Accordingly, the auxiliary tray or the separate holder may be opened or closed as a part of the set, and may also be configured as a separate part completely separated from the set.

Figure 3:
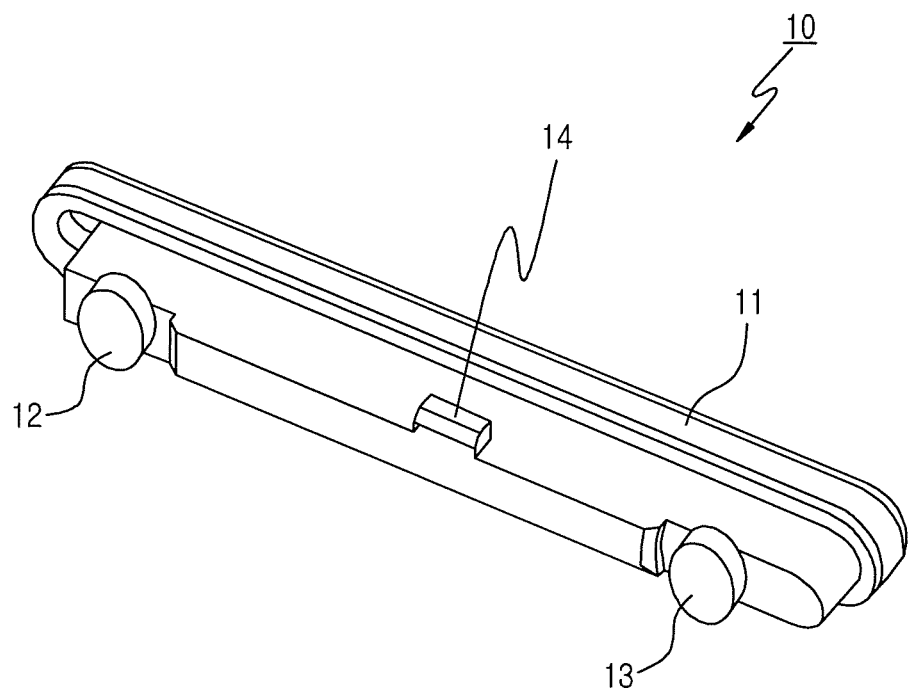
FIG. 3 is a perspective view illustrating a cover and key button detachably installed in an electronic device in a state where the external device of FIG. 1 is inserted into the electronic device according to an embodiment of the present disclosure.
Figure 4:
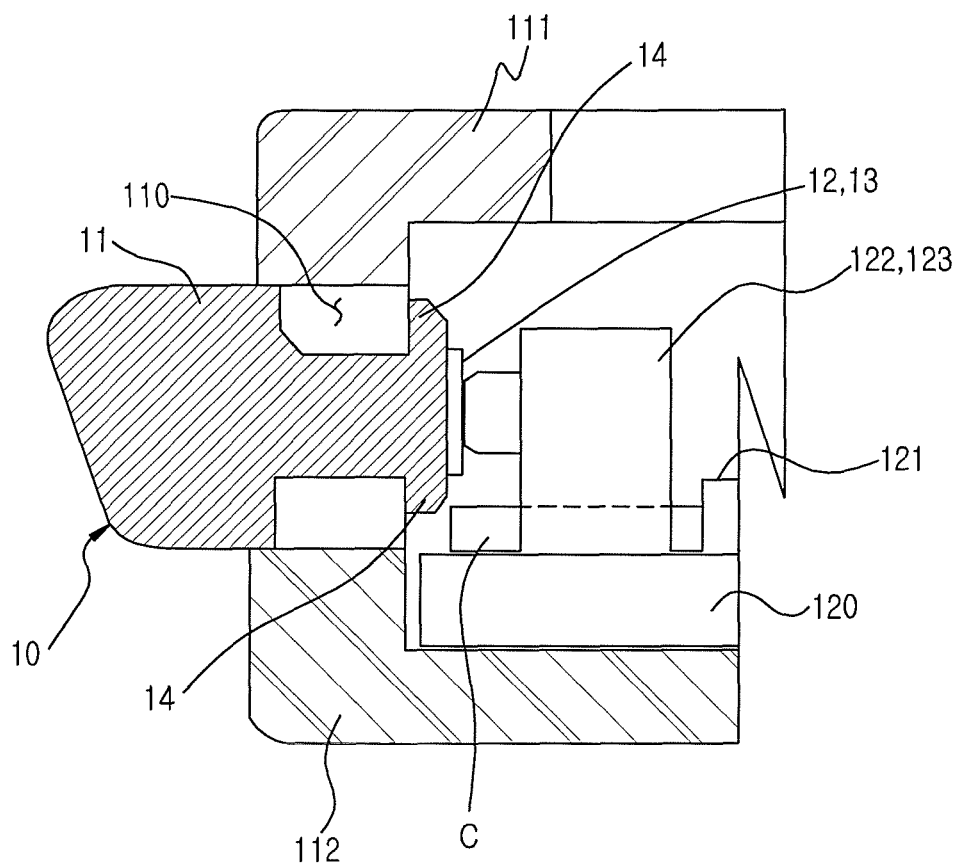
FIG. 4 is a cross-sectional view illustrating a cover and key button installed in an electronic device in a state where the external device of FIG. 1 is inserted into the electronic device according to an embodiment of the present disclosure.

FIG. 3 is a perspective view illustrating a cover and key button 10 detachably installed in the electronic device 100 in a state where the external device C of FIG. 1 is inserted into the electronic device according to an embodiment of the present disclosure. FIG. 4 is a cross-sectional view illustrating a cover and key button 10 installed in an electronic device in a state where the external device C of FIG. 1 is inserted into the electronic device 100 according to an embodiment of the present disclosure.

Referring to FIGS. 3 and 4, the cover and key button 10 may include a body 11 with a certain length and pressurizing protrusions 12 and 13 protruding toward the switching units 122 and 123 and selectively pressurizing the switching unit 122 and 123, respectively.

Preferably, the body 11 may be formed to have a length corresponding to that of the slot 110 formed in the electronic device 100, and may be tightly inserted into the slot. Also, the body 11 may be configured to be separated from the electronic device 10 when a user desires.

The body may include at least one hook-type protrusion 14. When a portion of the body 11 is inserted into the slot 110, the hook-type protrusion 14 may be hooked on the inner side surface of a case frame 111 forming the slot 110 of the electronic device 100. Although not shown, the body 11 may be formed of a rubber or silicon material, and may be molded together with a hard type plastic material forming the outer surface of the key button.

The cover and key button 10 may be mounted in the slot 110 of the electronic device 100 by a snap-fit structure using the hook-type protrusion 14, and at ordinary times, may be attached to the electronic device 100 to be used as a key button for data input/output. When a user outwardly pulls the cover and key button 10 with his or her nail, the cover and key button 10 may be separated.

Accordingly, when a user of the electronic device 100 applies the external device C to the electronic device 100, the key button 10 installed in the electronic device 100 may be pulled out by a nail and separated from the slot 110, and then the external device C may be inserted into the external device socket 121 mounted in the internal substrate 120 of the electronic device 10 corresponding to the slot 110. Thereafter, when the cover and key button 10 is pushed into the slot 110 by a certain pressure, the assembly may be completed. In this case, since the at least one hook-type protrusion 14 protruding from the body 11 of the cover and key button 10 is hooked on the inner side of the slot 110, the key button 10 may be prevented from being separated from the electronic device 100.

Figure 5:
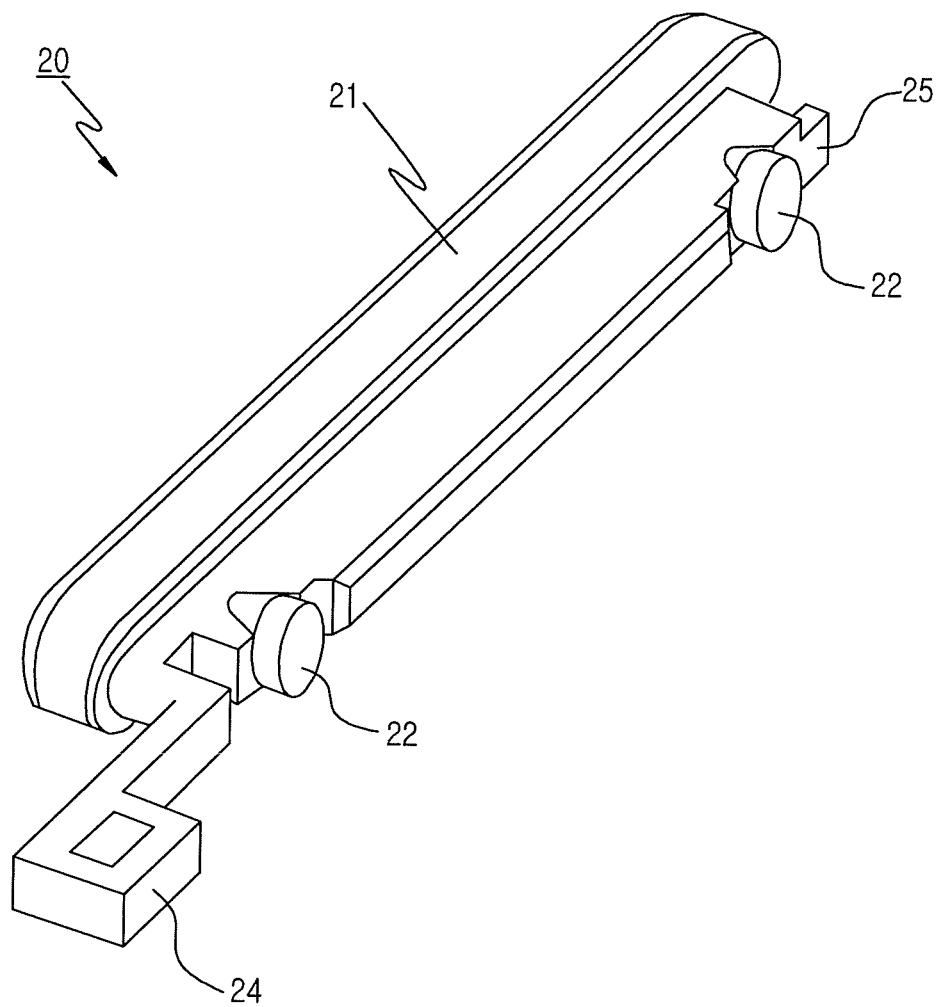
FIG. 5 is a perspective view illustrating a cover and key button according to various embodiments of the present disclosure.
Figure 6:
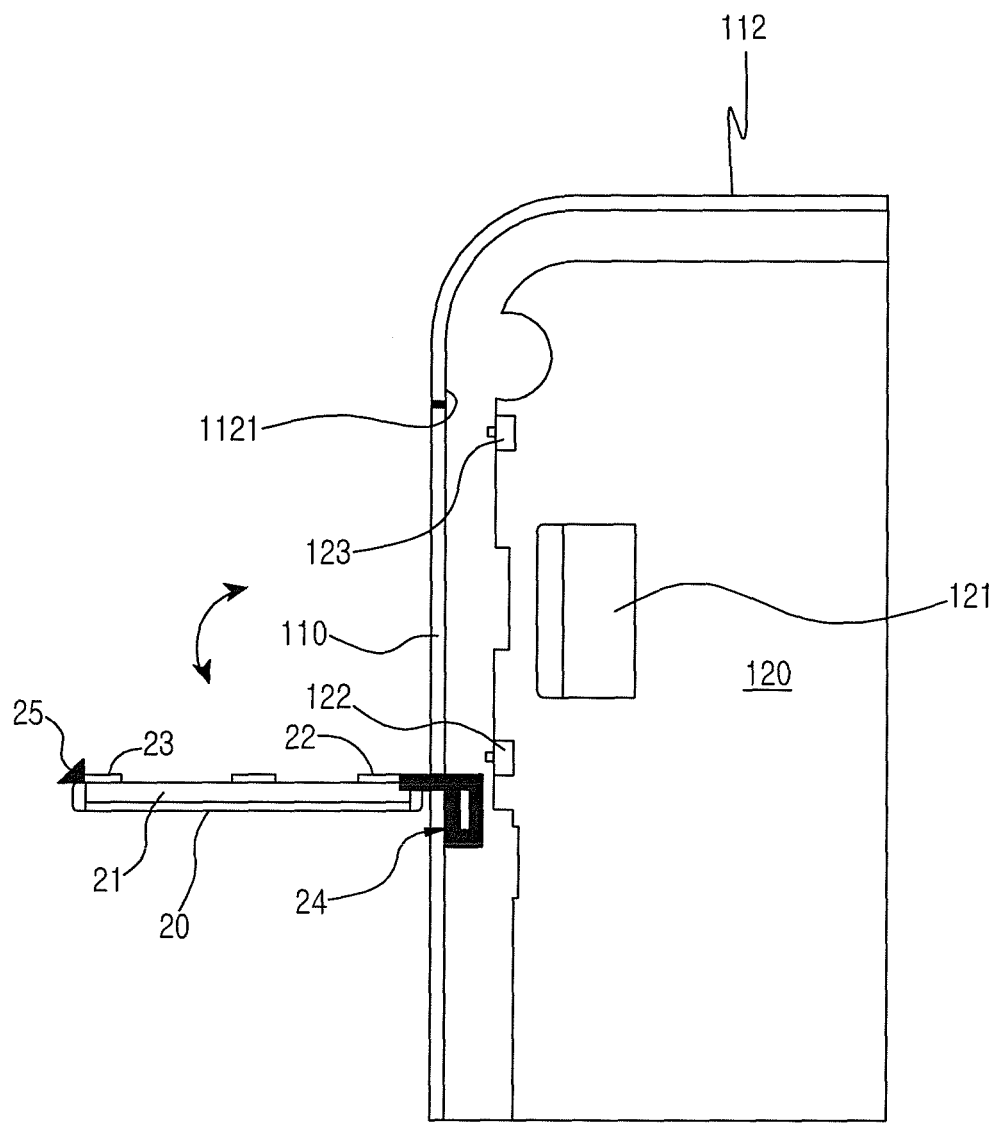
FIG. 6 is a view of a main part showing a state that the cover and key button of FIG. 5 is installed in the electronic device according to an embodiment of the present disclosure.

FIG. 5 is a perspective view illustrating a cover and key button according to another embodiment of the present disclosure. FIG. 6 is a view of a main part showing a state that the cover and key button of FIG. 5 is installed in the electronic device according to an embodiment of the present disclosure.

In the previous embodiment, the cover and key button 10 is configured to be completely separated from the slot 110 for receiving the external device C of the electronic device 100. However, in this embodiment, a cover and key button 20 may be configured to open the slot 110 of the electronic device 100 but not to be completely separated from the slot 110.

Referring to FIGS. 5 and 6, the cover and key button 20 may include a body 21 having a certain length and pressurizing protrusions 22 and 23 protruding toward the slot 110 of the electronic device 100. Also, the body 21 may include a fixing part 24 at one end thereof to allow the body 21 to be fixed to the inside of the slot 110 of the electronic device 100, and may include a hook-type protrusion 25 at the other end thereof.

Accordingly, the fixing part 24 of the cover and key button 20 may be fixed around the slot 110 of the case frame 112 of the electronic device 100, allowing the key button 20 not to be completely separated from the slot 110 even though the key button 20 is opened from the slot 110. Also, since the hook-type protrusion 25 formed on the end portion of the key button 20 may be hooked on the inner side surface 1121 of the slot 110, the key button 20 may not be arbitrarily opened when being mounted in the slot 110.

FIGS. 7A through 7D are views illustrating various example cover and key buttons applied in a state where the external device of FIG. 1 is inserted into an electronic device according to another embodiment of the present disclosure.

As shown in FIGS. 2 through 4, the data input/output unit such as a key button applied to the electronic device may have a very small size. Accordingly, it may be difficult for a user to separate the key button from the electronic device. Accordingly, this embodiment discloses various key buttons that can be easily separated by a user.

However, a pressurizing protrusion, a hook-type protrusion, and a fixing part formed on the bodies of each key button may be similar to those described in previous embodiments.

Figure 7A:
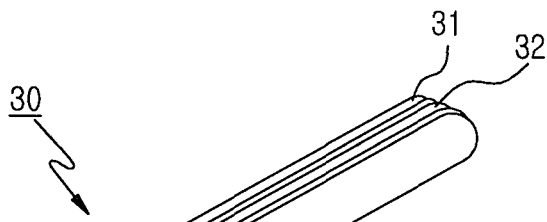
FIGS. 7A through 7D are views illustrating various example cover and key buttons applied in a state where the external device of FIG. 1 is inserted into an electronic device according to another embodiment of the present disclosure.

A key button 30 shown in FIG. 7A may have a hook slit 32 formed along the longitudinal direction of a body 31. The hook slit 32 may be formed at a location where the key button 30 is exposed to the outside even though the key button 30 is mounted in the electronic device, and a user may easily separate the key button 30 from the slot of the electronic device with a nail or a sharp tool.

Figure 7B:
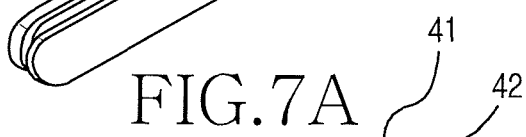

A key button 40 shown in FIG. 7B may have a separation protrusion 42 formed along the longitudinal direction of a body 41. The separation protrusion 42 may be injection-molded integrally with the body 41. In other embodiments, the separation protrusion 42 may be independently insert-molded and assembled with a flexible material such as rubber, silicone, and urethane. The separation protrusion 42 may be installed or formed at a location where the key button 40 is exposed to the outside even though the key button 40 is mounted in the electronic device. A user may separate the key button 40 from the slot of the electronic device with a frictional force and a hooking operation of the separation protrusion 42.

Figure 7C:
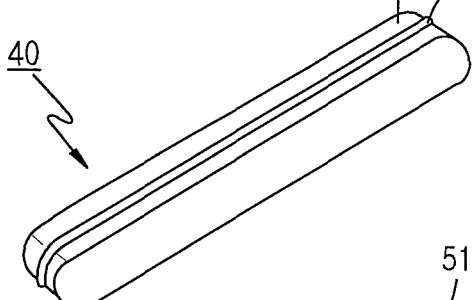

A portion of a body 51 of a key button 50 shown in FIG. 7C may be insert-molded and assembled with a flexible material 52 such as rubber, silicone, and urethane. Also, the flexible material 52 may have a different color from the key button 50 to provide a visual indication of volume up/down to a user when being applied as a volume key button. The flexible material 52 may be installed at a location where at least a portion of the key button 50 is exposed to the outside even though the key button 50 is mounted in the electronic device. Thus, a frictional force can be provided such that a user can easily remove the key button 50 mounted in the slot of the electronic device. Also, the key button 50 can be easily separated from the slot of the electronic device using a tool (e.g., a pin) having a sharp tip.

Figure 7D:
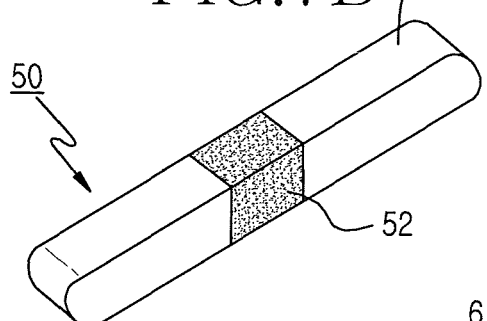

A key button 60 shown in FIG. 7D may have a hook groove 62 on which a fingernail of a user can be hooked at an appropriate location of a body 61. The hook groove 62 may also be formed at a location where at least a portion of the key button 60 is exposed to the outside even though the key button 30 is mounted in the electronic device.

In electronic devices with external device insertion structures according to various embodiments of the present disclosure, since a typical data input/output unit is used in common together with the external device insertion structure, a separate slot can be omitted, thereby improving the elegance of the exterior of the electronic device, reducing manufacturing costs, reducing assembly time, and thus improving the reliability of products.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
   a case frame;
   a slot formed in the case frame;
   a first unit disposed at a location corresponding to the slot inside the electronic device;
   a second unit corresponding to the slot inside the electronic device and installed around the first unit, wherein the second unit comprises a switching unit operated by a key button, and wherein a portion or all of the key button is installed to be detachable from the slot of the electronic device, such that the key button is usable as a cover and key button for the slot; and
   an external device detachably mounted in the first unit through the slot,
   wherein the key button comprises:
      a body;
      at least one pressuring protrusion that protrudes from the body to the slot to pressurize the switching unit; and
      at least one hook protrusion that protrudes from the body and prevents the key button from being separated from the slot by hooking on the inner side of the slot when the key button is mounted in the slot.

2. The electronic device of claim 1, wherein the body and the pressurizing protrusion is insert-molded with a flexible material and the exterior of the key button is formed of a substantially rigid material.

3. The electronic device of claim 2, wherein the flexible material comprises at least one of: rubber, silicone, and urethane.

4. The electronic device of claim 1, wherein the body further comprises a hook groove configured to be engaged by a user to open the key button from the slot of the electronic device.

5. The electronic device of claim 4, wherein the hook groove is formed to have a first depth along a longitudinal direction of the body.

6. The electronic device of claim 4, wherein the hook groove is a groove that is formed to have a first depth in at least a portion of the body and allow a nail or a tool to be hooked in the groove.

7. The electronic device of claim 1, wherein a portion of the body is insert-molded or assembled with a more flexible material than a surrounding material.

8. The electronic device of claim 7, wherein the flexible material comprises at least one of: rubber, silicone, and urethane.

9. The electronic device of claim 1, further comprising a separation protrusion configured to protrude from the body along a longitudinal direction of the body.

10. The electronic device of claim 9, wherein the separation protrusion is insert-molded and assembled with a more flexible material than the body.

11. The electronic device of claim 10, wherein the flexible material comprises at least one of: rubber, silicone, and urethane.

12. The electronic device of claim 10, wherein the electronic device comprises a mobile terminal.

13. An electronic device comprising:
a case frame;
a slot formed in the case frame;
a socket disposed at a location inside the electronic device and aligned with the slot, the socket is adapted to receive a card-type external device through the slot;
a switching unit disposed around the socket and aligned with the slot;
the card-type external device detachably mounted in the socket through the slot; and
a key button disposed in the slot to partially enclose the socket and configured to actuate the switching unit by pressurization,
wherein the key button comprises:
a body;
at least one pressuring protrusion that protrudes from the body to the slot to pressurize the switching unit; and
at least one hook protrusion that protrudes from the body and prevents the key button from being separated from the slot by hooking on the inner side of the slot when the key button is mounted in the slot.

14. The electronic device of claim 13, wherein the body and the pressurizing protrusion is insert-molded with a flexible material and the exterior of the key button is formed of a substantially rigid material.

15. The electronic device of claim 14, wherein the flexible material comprises at least one of: rubber, silicone, and urethane.

16. The electronic device of claim 13, wherein the body further comprises a hook groove configured to be engaged by a user to open the key button from the slot of the electronic device.

17. The electronic device of claim 16, wherein the hook groove is formed to have a first depth along a longitudinal direction of the body.

18. The electronic device of claim 16, wherein the hook groove is a groove that is formed to have a first depth in at least a portion of the body and allow a nail or a tool to be hooked in the groove.

19. The electronic device of claim 13, wherein a portion of the body is insert-molded or assembled with a more flexible material than a surrounding material.

20. The electronic device of claim 16, wherein the flexible material comprises at least one of: rubber, silicone, and urethane.

* * * * *